(12) United States Patent
Swanson

(10) Patent No.: US 10,735,046 B1
(45) Date of Patent: Aug. 4, 2020

(54) METHOD OF SPREAD CODE ACQUISITION USING PHASE MULTIPLEXED SHUFFLED CORRELATION AND CONCURRENT TWO PARAMETER ALIGNMENT SCREENING

(71) Applicant: United States of America as represented by the Secretary of the Navy, San Diego, CA (US)

(72) Inventor: Paul D. Swanson, Lakeside, CA (US)

(73) Assignee: United States Government as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/598,601

(22) Filed: Oct. 10, 2019

(51) Int. Cl.
    *H04B 1/7075*    (2011.01)
    *H04B 1/7077*    (2011.01)
    *H04J 13/00*    (2011.01)

(52) U.S. Cl.
    CPC ..... *H04B 1/70752* (2013.01); *H04B 1/70755* (2013.01); *H04B 1/70775* (2013.01); *H04J 13/0022* (2013.01)

(58) Field of Classification Search
    CPC ............ H04B 1/70752; H04B 1/70755; H04B 1/70775; H04J 13/0022
    USPC ........................................................ 375/147
    See application file for complete search history.

(56) References Cited

U.S. PATENT DOCUMENTS

| | | |
|---|---|---|
| 6,363,049 B1 | 3/2002 | Chung |
| 8,300,675 B2 | 10/2012 | Kerr et al. |
| 8,396,096 B2 * | 3/2013 | Noel ................... H04B 7/0842 375/130 |
| 9,528,243 B1 | 12/2016 | Schaffner |
| 10,281,584 B2 | 5/2019 | Turner et al. |
| 2002/0176486 A1 * | 11/2002 | Okubo .................. H04B 1/707 375/146 |
| 2004/0001534 A1 * | 1/2004 | Yang ..................... H04B 1/707 375/143 |
| 2009/0103593 A1 * | 4/2009 | Bergamo ................ H04J 13/00 375/146 |
| 2016/0116599 A1 * | 4/2016 | Turner ................... G01S 19/30 342/357.68 |
| 2019/0068240 A1 * | 2/2019 | Michaels ............... H04B 1/709 |
| 2019/0173518 A1 * | 6/2019 | Ataie .................. H04B 1/7085 |

OTHER PUBLICATIONS

Joseph Chege, "Acquisition of Direct-Sequence Spread-Spectrum Signals," The University of Nairobi, May 13, 2016.

* cited by examiner

*Primary Examiner* — Hirdepal Singh
(74) *Attorney, Agent, or Firm* — Naval Information Warfare Center Pacific; Kyle Eppele; J. Eric Anderson

(57) ABSTRACT

A receiver is provided for acquiring a DSSS signal. The receiver includes a splitter, a first multiplier, a second multiplier and a processor. The splitter is operable to split the DSSS signal into a first DSSS signal and a second DSSS signal. The first multiplier is operable to multiply the first DSSS signal by a shuffled pseudo-noise sequence and a sine function to obtain a first correlation value. The second multiplier is operable to multiply the second DSSS signal by the shuffled pseudo-noise sequence and a cosine function to obtain a second correlation value. The processor is operable to determine an alignment delay based on the first correlation value and the second correlation value.

3 Claims, 11 Drawing Sheets

FIG. 5

METHOD OF SPREAD CODE ACQUISITION USING PHASE MULTIPLEXED SHUFFLED CORRELATION AND CONCURRENT TWO PARAMETER ALIGNMENT SCREENING

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 36000, San Diego, Calif., 92152; telephone (619) 553-5118; email: ssc_pac_t2@navy.mil. Reference Navy Case No. 109982.

BACKGROUND OF THE INVENTION

The present disclosure generally relates to acquisition of direct-sequence spread-spectrum (DSSS) signals.

As discussed in Chege, "Acquisition of Direct-Sequence Spread-Spectrum Signals," 2011, DSSS is a spread-spectrum signaling technique in which a data sequence is used to modulate a wideband code. The data sequence is a fast pseudo-randomly generated sequence, with the result that the narrowband data sequence is transformed into a wideband noise-like signal. The resulting wideband signal then undergoes a second stage of modulation, where phase-shift keying is used. Synchronization of the spreading code is of utmost importance in any spread-spectrum system. The proper operation of the system depends on how well synchronization is done. A solution to the synchronization problem consists of two parts, referred to as acquisition and tracking. Acquisition may be regarded as coarse synchronization and, being the first step in the synchronization procedure, must work very efficiently, after which tracking can be performed and synchronization ultimately achieved.

A DSSS system uses a noise-like spreading code referred to as a pseudo-noise (PN) sequence. As further discussed in Chege, a PN sequence is a periodic binary sequence with an autocorrelation that resembles, over a period, the autocorrelation of a random binary sequence. Its autocorrelation also roughly resembles the autocorrelation of bandlimited white noise. Ideally, one would want to use a truly random binary sequence. However, for the data to be recovered, the receiver needs to know the code that was used for spreading. This knowledge is unavailable in a non-deterministic process like a random binary sequence, hence the use of PN sequences, which are deterministic.

As further discussed in Chege, at the spread-spectrum receiver, the corresponding chips in the spreading sequence must precisely or nearly coincide. Any misalignment causes the signal amplitude at the demodulator to fall in accordance with the autocorrelation function, leading to signal degradation. Synchronization includes acquisition, wherein the phase, or delay in time, of the receiver-generated sequence is brought within phase of the received sequence.

Longer spreading codes have the advantage of greater security and the possibility of more low cross correlation codes operating simultaneously. However longer codes also require more time to acquire. This procedure provides a quick way to identify and determine the sequence timing of a spreading code. In prior art systems, individual code blocks check the correlation of a single alignment by reaching an integrated data signal power threshold within a given time period. Only a small subset of the total number of possible alignments is checked at a time, sequentially testing subsets until the alignment is found. If the alignment is changing with time (as is the case with a Doppler shifted signal), it is possible that alignment will switch to a previously tested location, and thus be missed. If alignment is not found after testing all possible alignments, the process is repeated.

FIG. 1 illustrates a prior art DSSS system 100. As shown in the figure, DSSS system 100 includes a transmitter 102 and a receiver 104.

In operation, at transmitter 102, data 106 is exclusively or'ed (XORed) with a spreading sequence PN 108 to generate a DSSS signal 110. Transmitter 102 transmits DSSS signal 110 to receiver 104, wherein along the transmission rout, DSSS signal 110 encounters noise 112 so as to create a received signal 114.

At receiver 104, a corresponding spreading sequence PN 116 is XORed to received signal 114 to extract the data for the channel that was "spread" by transmitter 102 with the same spreading sequence. However this only works when the receiver spread code is in perfect alignment with identical spread code of the transmitter. Before a receiver can extract the channel of interest, it must first determine the timing of the beginning of the transmitted spread code. This is usually done by checking each possible alignment, i.e., checking each phase delay, until the correct start alignment produces the anticipated data. It is assumed the correct alignment will produce the most transmitted power at frequencies less than the "chip" rate of the transmission. Time at each possible alignment is required to integrate this power by integrator 118 to see if it surpasses an arbitrary threshold. Eventually, after alignment is acquired, the decoded data 120 is passed to downstream circuitry for further processing.

FIG. 2 illustrates a graph 200 of integrated power over time of the prior art DSSS system of FIG. 1. As shown in the figure, graph 200 has a y-axis 202 in units of accumulated power, an x-axis 204 in units of time, a power threshold $P_{th}$ 206, a time threshold $t_{th}$ 208, a function 210 and a function 212.

As mentioned above, in DSSS system 100, receiver 104 must check each possible alignment for acquisition. When summing the correlated values of the received signal 114 with PN 116 at one phase, the accumulated power will eventually increase, even if there is no alignment. While the accumulated power eventually increases over time, if the rise in power takes too long, then alignment is likely not present. Accordingly, when designing DSSS system 100, the power threshold $P_{th}$ 206 and time threshold $t_{th}$ 208 are set to weed out unlikely prospects for alignment. For example, function 210 eventually reaches acceptable power threshold $P_{th}$ 206, meaning that over time, sufficient pits of PN 116 correlate with corresponding pits of the received signal 114, which has been offset by a predetermined phase, so as to generally increase the accumulated power. However, the rate of the rise of accumulated power of function 210 is insufficient to meet $P_{th}$ 206 prior to time threshold $t_{th}$ 208. Accordingly, a new phase will be used and the process will repeat. This will continue until an phase will provide an accumulated power function that reaches acceptable power threshold $P_{th}$ 206 prior to time threshold $t_{th}$ 208. This is represented by function 212.

The problem with DSSS system 100 is that many alignments may need to be tested, each of which until $t_{th}$ is reached, which wastes much time and processing resources.

There exists a need for a system and method for quickly and efficiently identifying the transmitted spread code sequence offset alignment and offset time dependence, even in the presence of a Doppler shift.

SUMMARY OF THE INVENTION

An aspect of the present disclosure is drawn to a receiver for acquiring a DSSS signal. The receiver includes a splitter, a first multiplier, a second multiplier and a processor. The splitter is operable to split the DSSS signal into a first DSSS signal and a second DSSS signal. The first multiplier is operable to multiply the first DSSS signal by a shuffled pseudo-noise sequence and a sine function to obtain a first correlation value. The second multiplier is operable to multiply the second DSSS signal by the shuffled pseudo-noise sequence and a cosine function to obtain a second correlation value. The processor is operable to determine an alignment delay based on the first correlation value and the second correlation value.

BRIEF DESCRIPTION OF THE DRAWINGS

The accompanying drawings, which are incorporated in and form a part of the specification, illustrate example embodiments and, together with the description, serve to explain the principles of the disclosure. A brief summary of the drawings follows.

FIG. 5 illustrates an arrangement of a shuffled PN in accordance with aspects of the present disclosure.

DETAILED DESCRIPTION OF THE EMBODIMENTS

The purpose of a receiver for and method of receiving a DSSS signal in accordance with the present disclosure is to speed up the time it takes to identify and acquire the timing information of long spreading codes used in a DSSS transmission. A receiver and method in accordance with the present disclosure achieves quick acquisition lock in the presence of multiple code transmissions, varying transmission frequency, Gaussian white noise, and Doppler shift. A receiver and method in accordance with the present disclosure are able quickly and efficiently identify the transmitted spread code sequence current offset position and offset time dependence, even in the presence of a Doppler shift. A person might refer to overall alignment as phase. However, for purposes of this disclosure, the term "phase" is reserved for the (in a working example discussed below) sixteen alignments being tested in a shuffled spread code. Offset position is the number of spread code bits (called chips) the received signal spread code is off from the alignment that is currently being tested, whereas conventional correlators only test one alignment at a time. Offset time is the offset position times the length of a time of a spread code chip. When the transmitted data is "spread," each bit of the data is multiplied by a number (called the spreading factor) of spread code chips, where the chip rate is the data bit rate times the spread factor.

Figure 3:
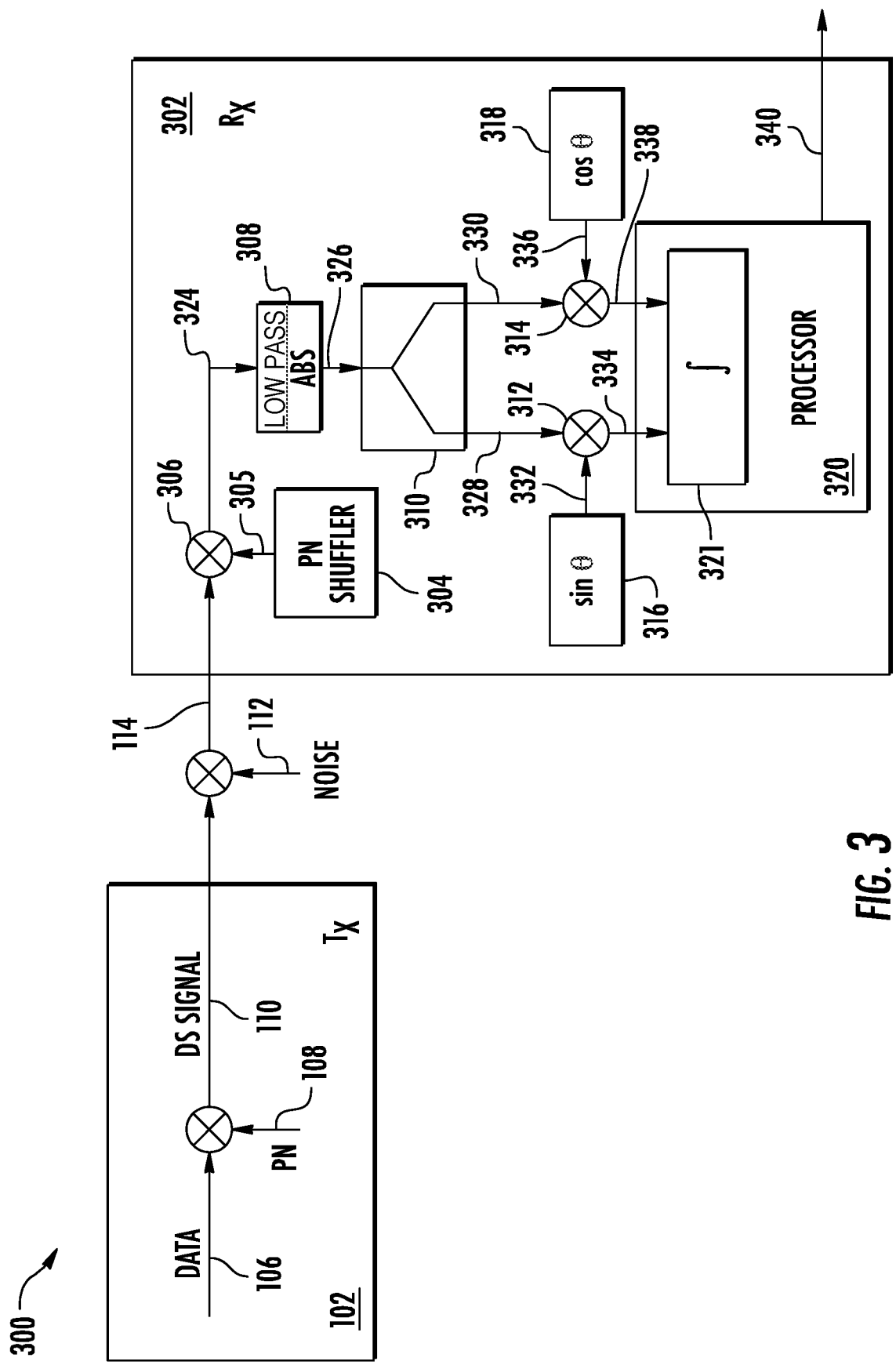
FIG. 3 illustrates a DSSS system in accordance with aspects of the present disclosure.

FIG. 3 illustrates a DSSS system 300 in accordance with aspects of the present disclosure. As shown in the figure, DSSS system 300 includes transmitter 102 and a receiver 302. Receiver 302 includes a PN shuffler 304, a correlator 306, an absolute value component 308, a splitter 310, a multiplier 312, a multiplier 314, a sine component 316, a cosine component 318 and a processor 320, which includes an integrator 321.

In this example, PN shuffler 304, correlator 306, absolute value component 308, splitter 310, multiplier 312, multiplier 314, sine component 316, cosine component 318 and processor 320 are illustrated as individual devices. However, in some embodiments, at least two of PN shuffler 304, correlator 306, absolute value component 308, splitter 310, multiplier 312, multiplier 314, sine component 316, cosine component 318 and processor 320 may be combined as a unitary device. Further, in some embodiments, at least one of PN shuffler 304, correlator 306, absolute value component 308, splitter 310, multiplier 312, multiplier 314, sine component 316, cosine component 318 and processor 320 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to Method of Spread Spectrum Code Acquisition Using Phase Multiplexed the processor. The processor and the tangible computer-readable media may reside in an application specific integrated circuit ("ASIC"). In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Figure 4:
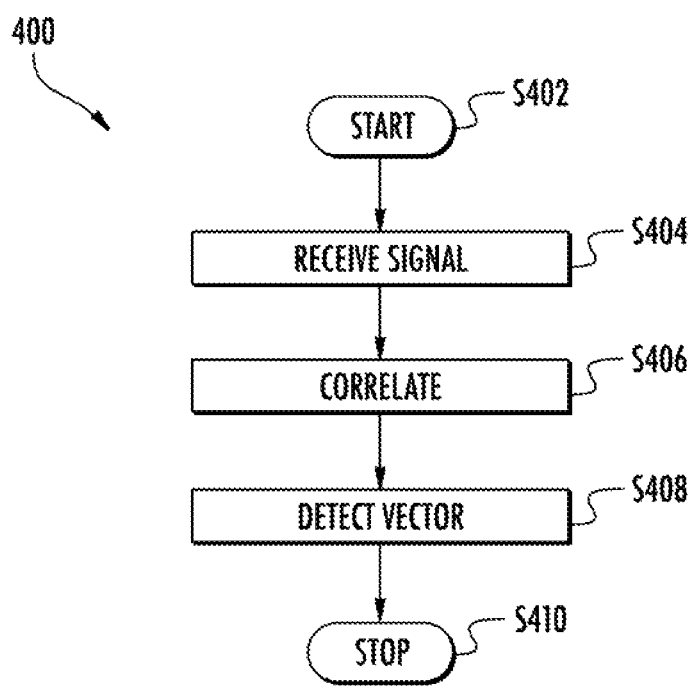
FIG. 4 illustrates an example method of using the DSSS system of FIG. 3 for signal acquisition in accordance with aspects of the present disclosure.

FIG. 4 illustrates an example method 400 of using DSSS system 300 for signal acquisition in accordance with aspects of the present disclosure. As shown in the figure, method 400 starts (S402) and a signal is received (S404). As shown in FIG. 3, receiver 302 receives received signal 114 from transmitter 102.

After the signal is received (S402), the signal is correlated (S406). As shown in FIG. 3, PN shuffler 304 provides a shuffled PN 305 to correlator 306 to correlate received signal 114.

PN shuffler 304 uses the PN, which is provided a priori and was used by transmitter 102 to generate DSSS signal 110, of length L bits and divides it into n sections, which are then each divided into m subsections consisting of k bits (L=n×m×k). Each $i^{th}$ subsection (i=1, 2, 3, ... m) is then separated and then circularly shifted by $(i-1)\times(L/m)$. The subsections are then recombined into a shuffled PN. This will be described in greater detail with reference to FIG. 5.

Figure 5:
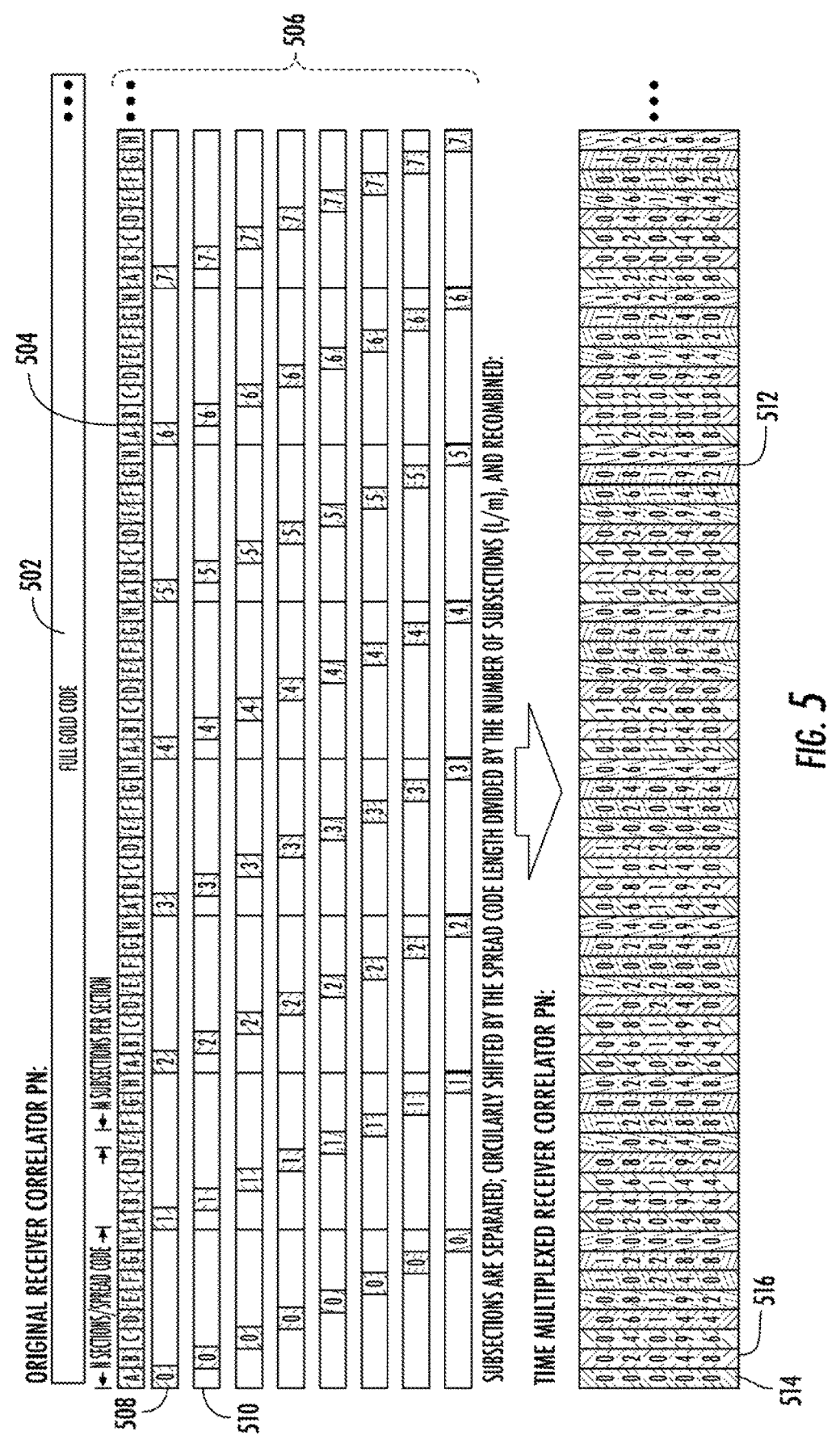

FIG. 5 includes a full PN 502 and indicates the different sections and repeating subsections 504. The separated subsections are shown for purposes of discussion as separated groups 506. For example, group 508 corresponds to the group of first subsections in all the sections, whereas the second group 510 corresponds to the group of second subsections in all the sections. Each group is then recombined, to create a shuffled PN 512, wherein the first set of bits 514 corresponds to the group of first subsections, the second set of bits 516 corresponds to the group of second subsections and so on.

In accordance with aspects of the present disclosure, each group within separated groups 506 will be assigned a distinct phase. Accordingly, as shuffled PN 512 is correlated with received signal 114, the plurality of phase (offsets) may be tested for alignment in a parallel fashion.

If the original PN with a phase of $(i-1)\times(L/m)$ is correlated with a shifted spread code, it will produce a positive or negative pulse every a period of (m×k) bits and a phase of $(i-0.5)\times(360°/m)$. Noting the phase and amplitude of the pulse identifies the alignment as 1 of the 16 being simultaneously tested. Because received signal 114 will be obscured by random superimposed signals caused by white noise, multiple transmissions, frequency and phase mismatches, it needs to be integrated over time to become observable.

Returning to FIG. 3, correlator 306 XORs received signal 114 sequentially with shuffled PN 512, then passes the consecutive XORed data 324 to absolute value component 308. In an example embodiment, absolute value component 308 comprises a low pass filter that averages over a period of one half the length of a subsection. This eliminates random positive and negative pulses with shorter pulse widths than the time it takes to receive k bits (or one subsection).

Absolute value component 308 outputs an absolute value signal 326 that is split by splitter 310 into an absolute value signal 328 and an absolute value signal 330. In an example embodiment, wherein received signal 114 is phase-shift keying (PSK) signal, absolute value signal 326 is split into the I and Q portions.

Absolute value signal 328 is provided to multiplier 312, whereas absolute value signal 330 is provided to multiplier 314. Sine component 316 provides a sine function 332 to multiplier 312, whereas cosine component 318 provides a cosine function 336 to multiplier 314. Multiplier 312 provides a Y value 334 to integrator 321, whereas multiplier 314 provides an X value 338 to integrator 321.

In operation, absolute value signal 326, which is the absolute value of the moving average, is multiplied by a sine function and cosine function. Each are then are separately added to an accumulating total within integrator 321. Integrator 321 generates an accumulated $X_{sum}$ value and an accumulated $Y_{sum}$ value, wherein $$X_{sum(n)} = X_{sum(n-1)} + |\text{averaged XOR}| \times \cos(Wt), \quad (1)$$

$$Y_{sum(n)} = Y_{sum(n-1)} + |\text{averaged XOR}| \times \sin(Wt), \text{ and} \quad (2)$$

$$W = 2\pi/(m \times k) \quad (3)$$

The variable t is the bit step, staring at the beginning of the receiver spread code.

If one of the sixteen (16) alignments being tested matches the received signal, the magnitude of the vector ($X_{sum}$, $Y_{sum}$) will steadily increase with the vector angle being in the direction of the phase associated with correct staring point in the spread code. This will be described with additional reference to FIGS. 6-7E.

Figure 6:
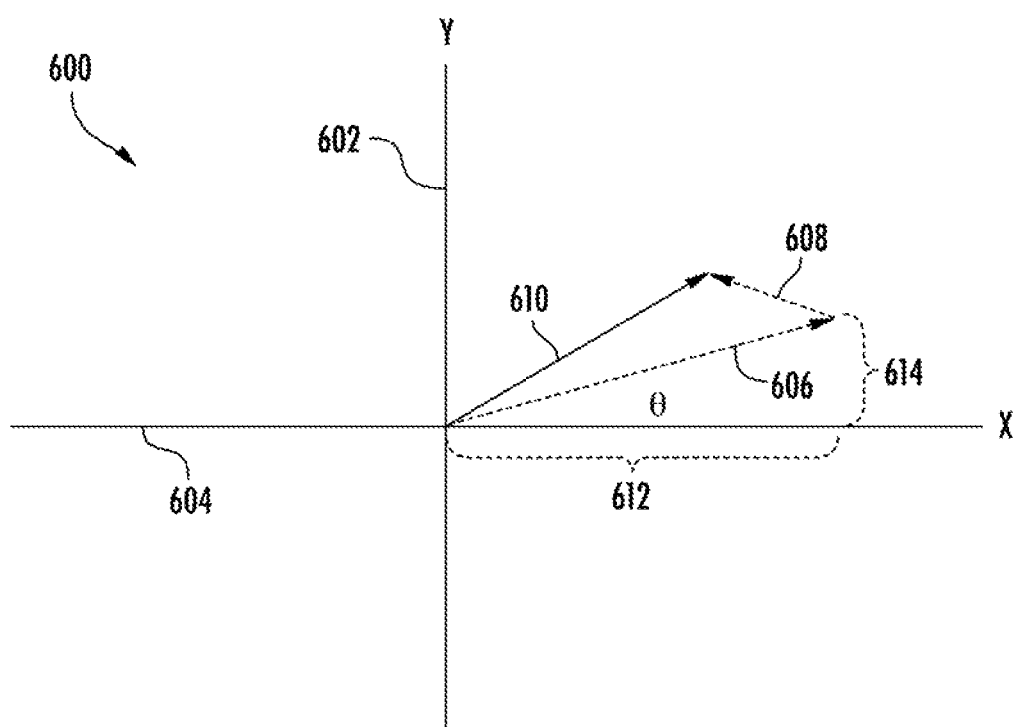
FIG. 6 illustrates the addition of correlation vectors for determining an alignment offset in accordance with aspects of the present disclosure.

FIG. 6 illustrates the addition of correlation vectors for determining an alignment phase in accordance with aspects of the present disclosure. FIG. 6 includes a graph 600 having a Y-axis 602, an X-axis 604, a vector 606, a vector 608 and a vector 610.

Vector 606 corresponds to a magnitude of an absolute value signal 326 for a first phase. The x component 612 of vector 606 is equal to the product of the magnitude and the cosine function, for example as produced by multiplier 314 as X value 338. They component 614 of vector 606 is equal to the product of the magnitude and the sine function, for example as produced by multiplier 312 as Y value 334.

Vector 608 corresponds to a magnitude of an absolute value signal 326 for a second phase of the next correlated value. The x component of vector 608 and they component of vector 608 are determined by multipliers 314 and 312 in the same manner as discussed above with reference to vector 606. The x component of vector 608 is added to the x component of vector 606 in integrator 321, while they component of vector 608 is added to the y component of vector 606 in integrator 321. Accordingly, as shown in FIG. 6, the final sum vector is vector 610. This process continues until all the correlation vectors, for all the phase delays, are added together.

Because of the pseudo-random nature of the shuffled PN, when all correlation vectors, which correspond to the correlation values, are added together, many of the dummy values will cancel each other out. While some phases may provide an overall measurable magnitude final vector, only the phase value that aligns with PN 108 of transmitter 102 will constantly provide a vector having substantially large magnitude. This will be further described with reference to FIGS. 7A-E.

Figure 7A:
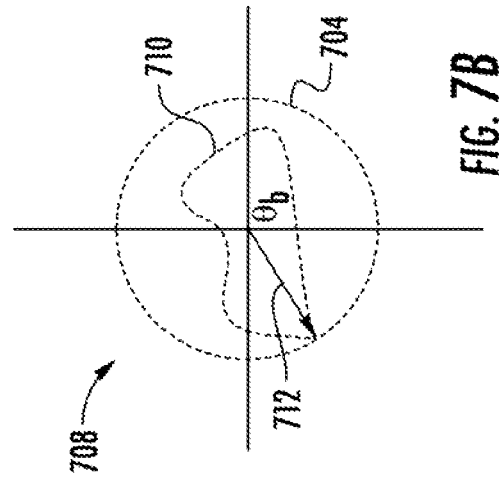
FIG. 7A illustrates correlation vectors associated with a first round of correlation in accordance with aspects of the present invention.

FIG. 7A illustrates correlation vectors associated with a first round of correlation in accordance with aspects of the present invention. As shown in the figure, a graph 700 includes a dotted curve 702, a unit circle 704 and a representative vector 706. In this example, there are sixteen (16) phase values that produce sixteen (16) different respective correlation vectors. Dotted curve 702 represents an outline of the values of the different correlation vectors. As can be seen in the figure, many correlation vectors will have a low magnitude, corresponding to a low correlation value, whereas at least four (4) have a high magnitude, corresponding to a high correlation value. Representative vector 706 is one such phase value, $\theta_a$, that results in a large magnitude and therefore a corresponding high correlation value. Clearly, only one phase can align with PN 108 and thus continually produce a large magnitude. Such a phase will be revealed as more rounds of correlation are performed.

Figure 7B:
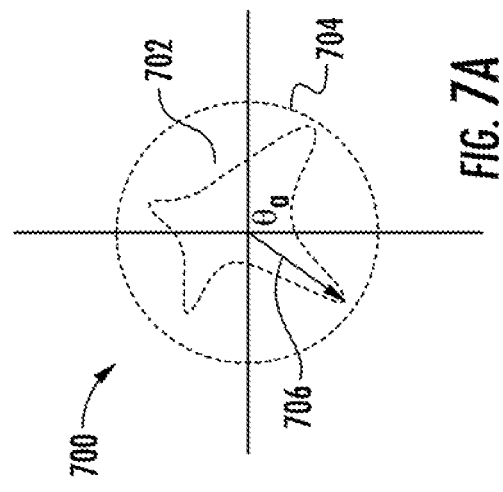
FIG. 7B illustrates correlation vectors associated with a subsequent round of correlation in accordance with aspects of the present invention.

FIG. 7B illustrates correlation vectors associated with a subsequent round of correlation in accordance with aspects of the present invention. As shown in the figure, a graph 708 includes a dotted curve 710, unit circle 704 and a representative vector 712. Again, in this example, there are sixteen (16) phase values that produce sixteen (16) different respective correlation vectors. Dotted curve 710 represents an outline of the values of the different correlation vectors. As can be seen in the figure, many correlation vectors will have a low magnitude, corresponding to a low correlation value, whereas some have a high magnitude, corresponding to a high correlation value. Representative vector 712 is one such phase value, $\theta_b$, that results in a large magnitude and therefore a corresponding high correlation value. While phase value $\theta_a$ as shown in FIG. 7A is slightly less than phase value $\theta_b$, as will be seen, this difference will decrease as more rounds of correlation are performed.

Figure 7C:
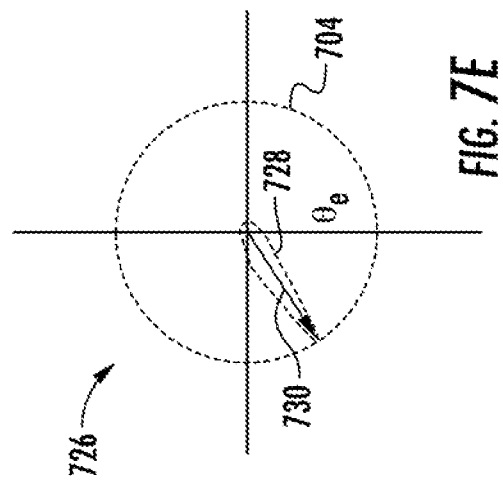
FIG. 7C illustrates correlation vectors associated with a further subsequent round of correlation in accordance with aspects of the present invention.

FIG. 7C illustrates correlation vectors associated with a further subsequent round of correlation in accordance with aspects of the present invention. As shown in the figure, a graph 714 includes a dotted curve 716, unit circle 704 and a representative vector 718. Again, in this example, there are sixteen (16) phase values that produce sixteen (16) different respective correlation vectors. Dotted curve 716 represents an outline of the values of the Method of Spread Spectrum Code Acquisition Using Phase Multiplexed different correlation vectors. As can be seen in the figure, many correlation vectors will have a low magnitude, corresponding to a low correlation value, whereas some have a high magnitude, corresponding to a high correlation value. Representative vector 718 is one such phase value, $\theta_c$, that results in a large magnitude and therefore a corresponding high correlation value. Phase value $\sigma_c$ is greater than phase value $\theta_a$ of FIG. 7A, but is less than phase value $\theta_b$ of FIG. 7B. Accordingly, as more rounds of correlation are performed, the phase becomes more stable.

Figure 7D:
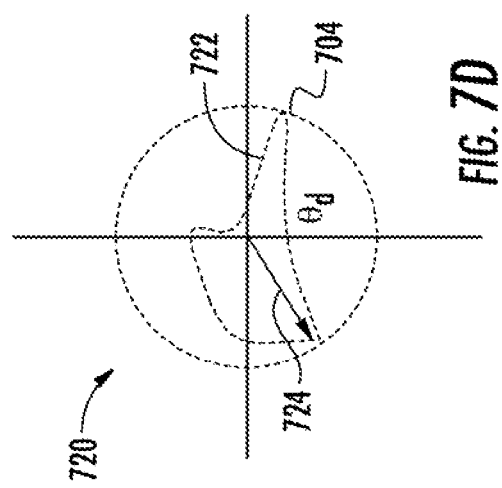
FIG. 7D illustrates vector associated with a final round of correlation in accordance with aspects of the present invention.

FIG. 7D illustrates correlation vectors associated with a further subsequent round of correlation in accordance with aspects of the present invention. FIG. 7D includes a graph 720 having a dotted curve 722, unit circle 704 and a representative vector 724. Representative vector 724 has phase value, $\theta_d$, that results in a large magnitude and therefore a corresponding high correlation value. Phase value $\theta_d$ is substantially similar to phase value $\theta_c$ of FIG. 7C.

Figure 7E:
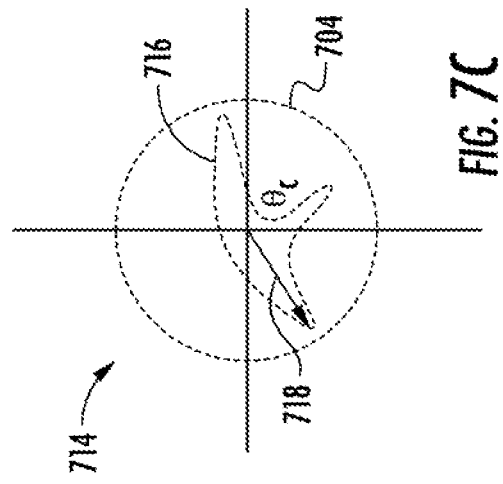
FIG. 7E illustrates a summed vector to associated with the rounds of correlation of FIGS. 7A-D.

FIG. 7E illustrates a summed vector associated with the rounds of correlation of FIGS. 7A-D. FIG. 7E includes a graph 726 having a dotted curve 728, unit circle 704 and a representative vector 730. Dotted curve 728 represents the summation of all the values of the different correlation vectors from all previous rounds of correlation. In particular, integrator 321 will add consecutive correlation vectors from consecutive correlations in accordance with equations (1)-(3) discussed above. As can be seen in the figure, most correlation vectors will eventually cancel one another out, leaving only the single vector 730 having a high magnitude, which corresponds to the phase having the highest correlation value.

Figure 8:
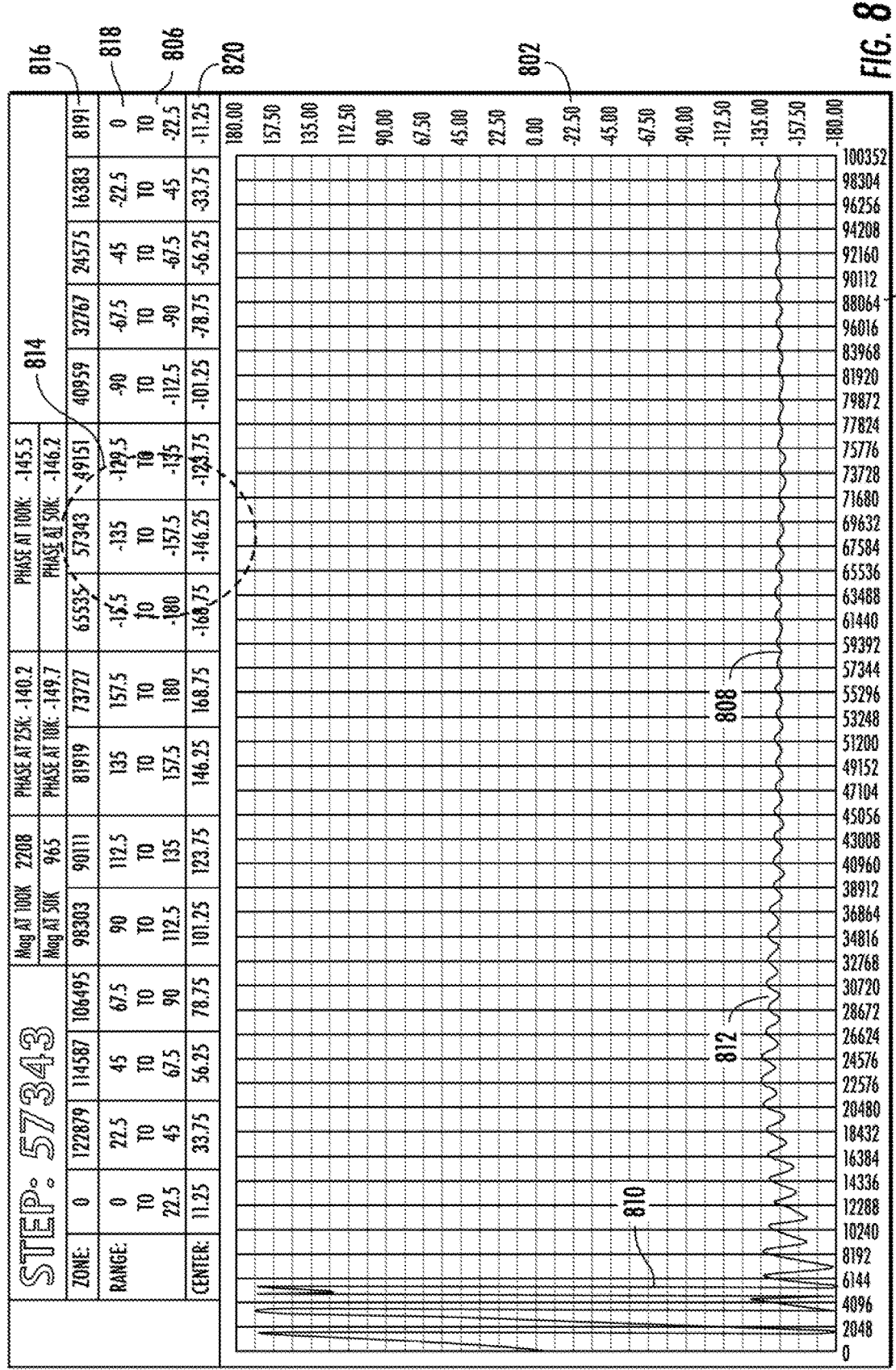
FIG. 8 illustrates a graph of acquisition as a function of phase offset.

FIG. 8 illustrates a graph 800 of acquisition as a function of phase offset. As shown in the figure, graph 800 includes a y-axis 802 in phase angle, an x-axis 804 in correlation number, a zone key 806 and a function 808. Function 808 includes an initial portion 810 and a second portion 812. Zone key 806 includes sixteen (16) zones (columns), a sample of which is indicated as zone 814. Zone key additionally includes three (3) rows, a zone row 816, a range row 818 and center row 820.

Function 808 is the phase of the vectored accumulated correlation for a received signal. The phase of initial portion 810 varies widely as new correlation vectors are added as discussed above with reference to FIGS. 7A-E. However, as more and more correlations are performed, the phase becomes more stable in second portion 812 and eventually stabilizes to approximately −146°.

Zone key 806 divides the possible 360° phase delays (−180°-+180°) into sixteen phase delay zones. In this example the entire sequence was divided into m (or 16 in this example) "zones." The shuffled spread code's first alignment tests the first alignment of each of the 16 zones. Zone row 816 gives the alignment position of the original spread code for the first alignment position of each "zone." Range row 818 shows the range in phases for each zone, respectively, whereas center row 820 shows the center phase for each zone, respectively. It is clear from the figure that the approximately −146° stabilized phase from function 808 is within zone 814. Therefore, a delay of −146° is the delay required to align with PN 108 from receiver 102.

FIG. 8 shows a 16-alignment phase multiplexed correlation check for a received signal that aligns with the 57,343$^{rd}$ step of a 17$^{th}$ order spread sequence, wherein L=2$^{17}$−1=131071, n=64, m=16 and k=128. The 16-multiplexed correlator reduces the number of correlations required to find the spread sequence timing, while also provides an extra figure of merit (consistent with the polar accumulator phase). Here, the "accumulator" is a vector, which in polar coordinates, is a magnitude and phase, which are the two figures of merit (increasing magnitude, stable phase). Another advantage of this polar accumulation is that any DC component of the variable being accumulated is canceled out over each rotation. In a one dimensional accumulator, this DC component steadily grows, obscuring the growth of the signal of interest.

Figure 9:
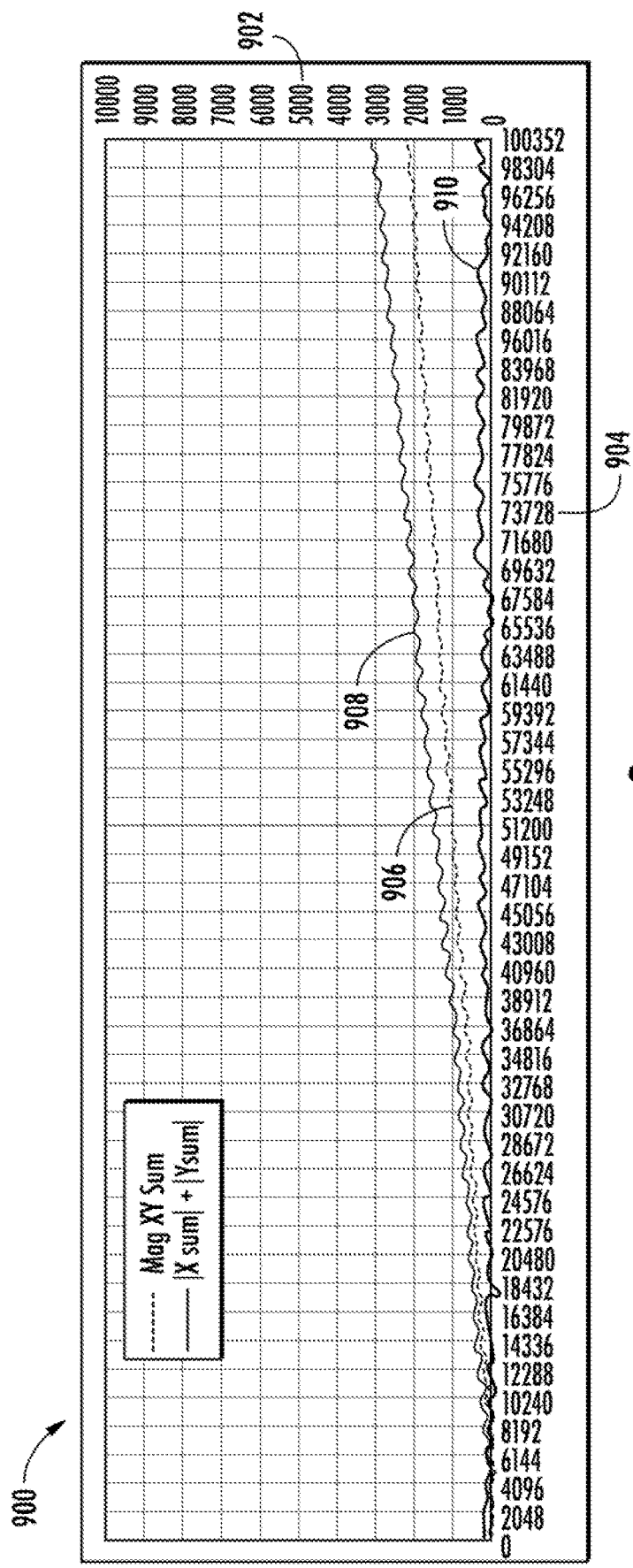
FIG. 9 illustrates the sum of the x-components and y-components of correlation vectors.

FIG. 9 illustrates a graph 900 of the sum of the x-components and y-components of the vectored accumulated correlation. As shown in the figure, graph 900 includes a y-axis 902 in power units, an x-axis 904, a function 906, a function 908 and a function 910.

Function 906 corresponds to the sum of the magnitudes of the correlation vectors. For example, returning to FIG. 6, the magnitude of vector 606 is equal to the square root of the sum of the square of x component 612 and the square of y component 614. Such a $(x^2+y^2)^{1/2}$ calculation uses a large amount of processing resources.

Function 910 corresponds to the magnitude of the accumulated correlation vector when none of the sixteen phase alignments correspond to the spread code alignment of the received signal. Function 906 corresponds to the magnitude of the accumulated correlation vector when one of the sixteen phase alignments corresponds to the spread code alignment of the received signal. Function 908 corresponds to the absolute value of the sum of the x components and the absolute value of the sum of they components when one of the sixteen phase alignments corresponds to the spread code alignment of the received signal. It is clear from the figure, that function 908 is a close approximation of function 906. More importantly, function 908 is derived from a much easier calculation, particularly given that the absolute values of each vector are provided by the conjunction of the functions of absolute value component 308, sine component 316 and cosine component 318 as shown in FIG. 3. Therefore, it is useful to use function 908 as opposed to function 906 to determine that one of the sixteen phase alignments is correct.

Figure 1:
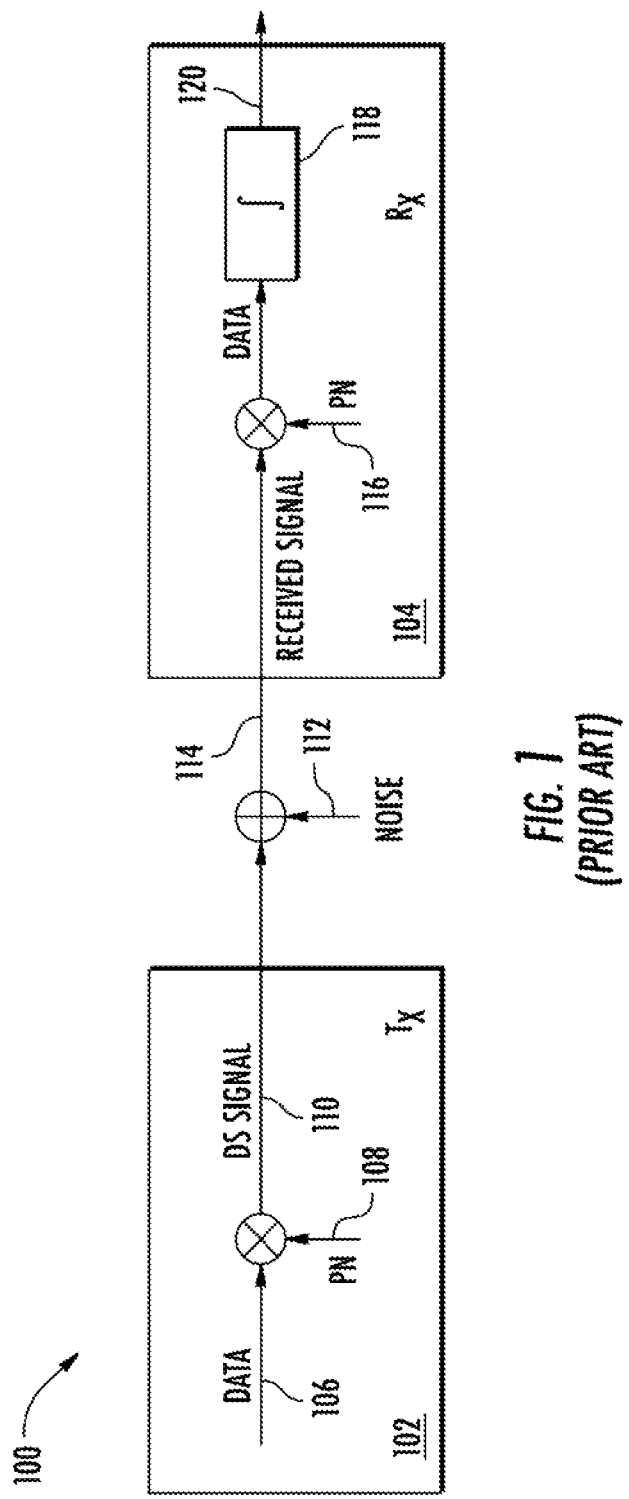
FIG. 1 illustrates a prior art DSSS system.
Figure 2:
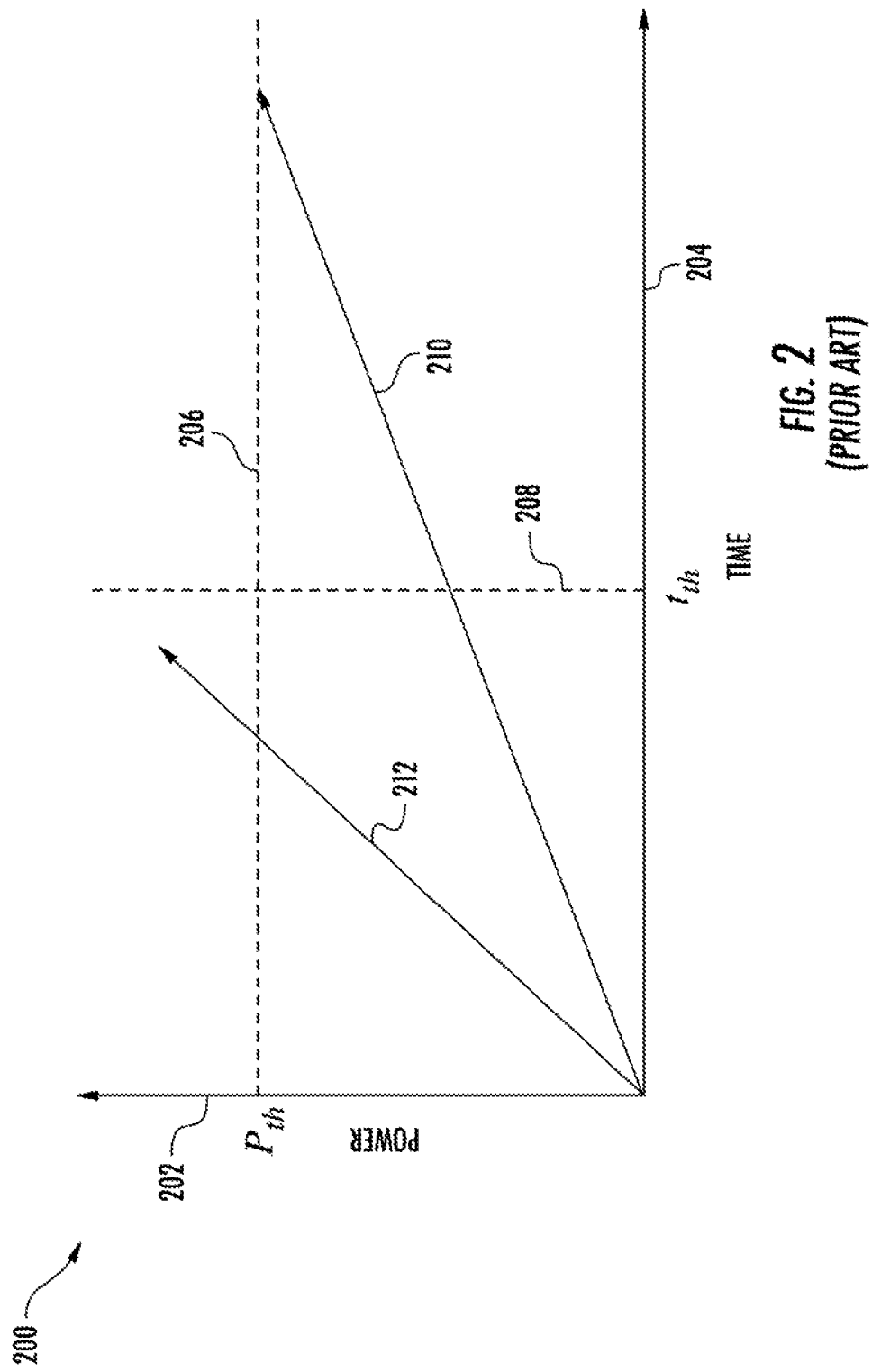
FIG. 2 illustrates a graph of integrated power over time of the prior art DSSS system of FIG. 1.

It should further be noted that each of 312 and 314 are arranged to output binary values of −1 and +1, as opposed to binary output values of 1 and 0. In this manner, if two dummy data bits in shuffled PN provide opposite correlation values, the +1 value will cancel the opposite −1 value. On the other hand, if values of 0 and 1 were used, and the two dummy data bits in shuffled PN were to provide opposite correlation values, the +1 value will only add to the summed correlation vector. This is related to the problem with the prior art systems discussed above with reference to FIG. 2—particularly vector 210. Specifically, even if there is no actual correlation, a sufficient number of dummy data bits in a PN might provide a correlation value that increases an overall summed correlation value. On the contrary, in accordance with the present disclosure, the dummy bits of the shuffled PN will, on average, cancel one another out, thus only leaving the aligned bits contributing the summed correlation value.

It should further be noted that in accordance with the present disclosure, if there is no alignment, then the summed correlation value would not increase, as shown in function 910 of FIG. 9.

Figure 10:
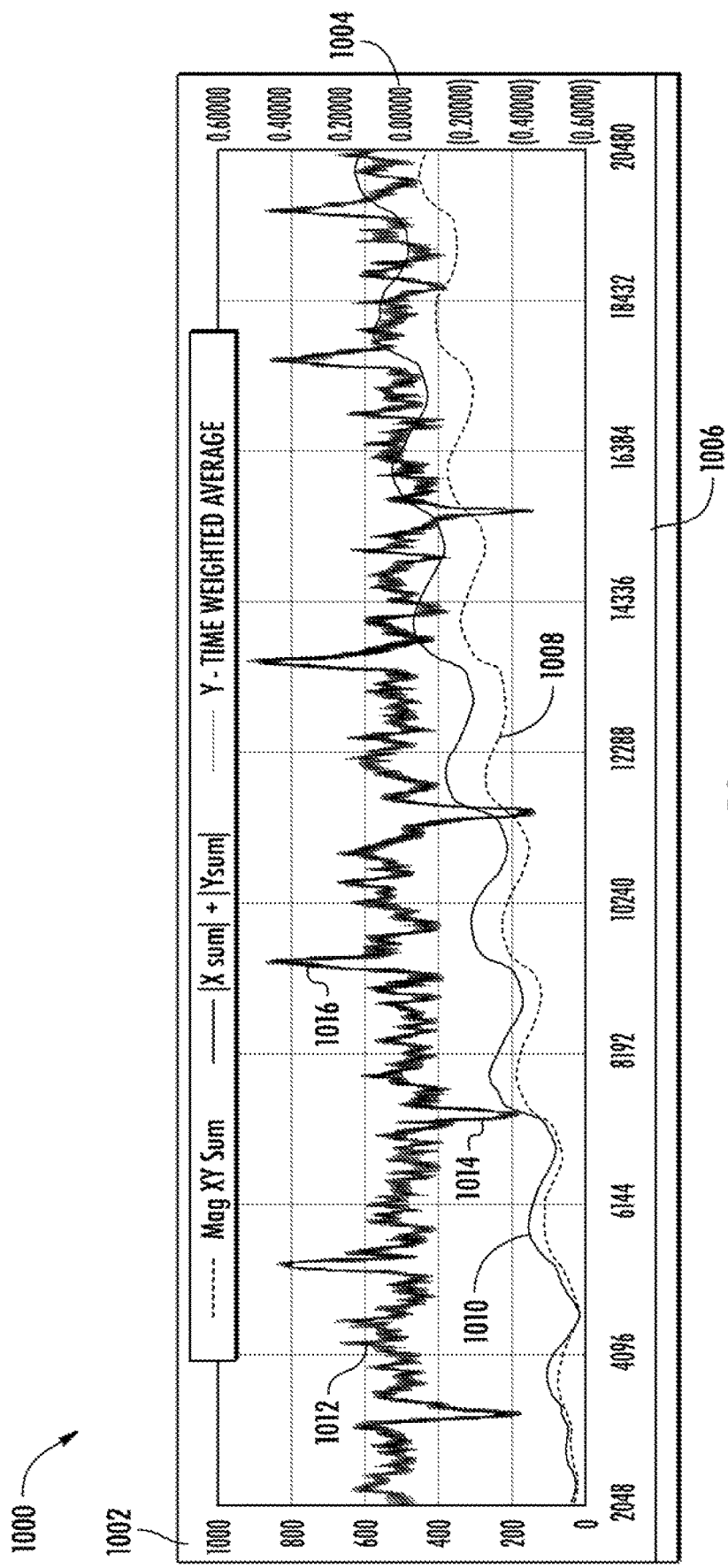
FIG. 10 illustrates correlation values as a function of phase offset.

FIG. 10 illustrates correlation values as a function of phase offset. As shown in the figure, a graph 1000 includes a y-axis 1002 in power units, a y-axis 1004 in units of phase angle delay, an x-axis 1006 in units of correlation iteration, a function 1008, a function 1010 and a function 1012.

Function 1008 corresponds to the sum of the magnitudes of the correlation vectors, whereas function 1010 corresponds to the absolute value of the sum of the x components and the absolute value of the sum of they components. Function 1012 corresponds to the time weighted average of the signal multiplied by the shuffled spread code. Absolute value signal 326 of FIG. 3 is the absolute value of function 1012. Absolute value signal 326 tracks the power of the aligned spread code sections and is easier to calculate than the actual power, which is the square of the function 1012.

As can be seen in graph 1000, both function 1008 and 1010 oscillate over each period of the sixteen parallel sampled phase delays. The oscillations result from the vector magnitudes of equal and opposite non-correlating data bits canceling one another out. However, there are slight periodic upticks in each of functions 1008 and 1010. The period of the upticks correspond to the phase delay of the one of the sixteen parallel sampled phase delays that consistently provides a large magnitude correlation value. As shown in function 1012, samples of these spikes in power are numbers as spike 1014 and spike 1016. Whether the spikes are positive (for example spike 1016) or negative (for example spike 1014) is dependent on the value of the data bit being spread by the spread code and not the spread code alignment itself. Integrating the power (or the absolute value) of 1012 insures that both positive and negative data bits contribute equally to the angle and magnitude of the accumulated correlation vector.

In short, FIG. 10 graphically illustrates how periodic samples greatly contribute to accumulated power, which directly point to a specific zone of phase delay. FIG. 8 on the other hand illustrates the exact phase delay responsible for alignment. FIG. 9 indicates that alignment is reached if accumulated power continues to increase. Accordingly, in a system of method of the present disclosure, the correct alignment is found when the phase angle stabilizes, as shown in FIG. 8, and the accumulated power continues to increase as shown in FIG. 9.

Doppler shift causes a mismatch in bit rates between the received signal and the receiver PN. This cause the alignment to skip a position when the timing mismatch adds up to the length of a bit. When this happens, integrator 321 can only accumulate a finite number of pulses before the alignment advances to the next position. For this reason it may be desirable to add the accumulation of a number or adjacent alignments in order to accumulate enough signal to make a determination. Even though multiple alignments are being added together, there will only be one alignment at any given time that is accumulating at the correct phase. Thus, the phase of the combined accumulation may be used to provide a match with the individual alignments within that group to identify the correct alignment. This allows a decision to be made with less signal strength.

This group accumulation can also be used to quickly check for all possible alignments without requiring a large number of correlators by doing long term accumulations with large sets of alignments while simultaneously doing short term accumulations within the current best performing group. For example, in the example described in FIG. 8, there are sixteen different zones. Zone 814 is identified as the zone having alignment. However, as indicated in range row 818, zone 814 includes phase delays from −135° to −157.5°. To obtain a more precise alignment, the range of −135° to −157° may be further divided into 16 zones and the correlation (S406 of FIG. 4), may be repeated.

Also, since correlations are being performed in parallel, the correct correlation can be determined by having it besting its competitors instead of reaching an arbitrary threshold value within an arbitrary time, for example as discussed above with reference to FIG. 2.

Figure 11:
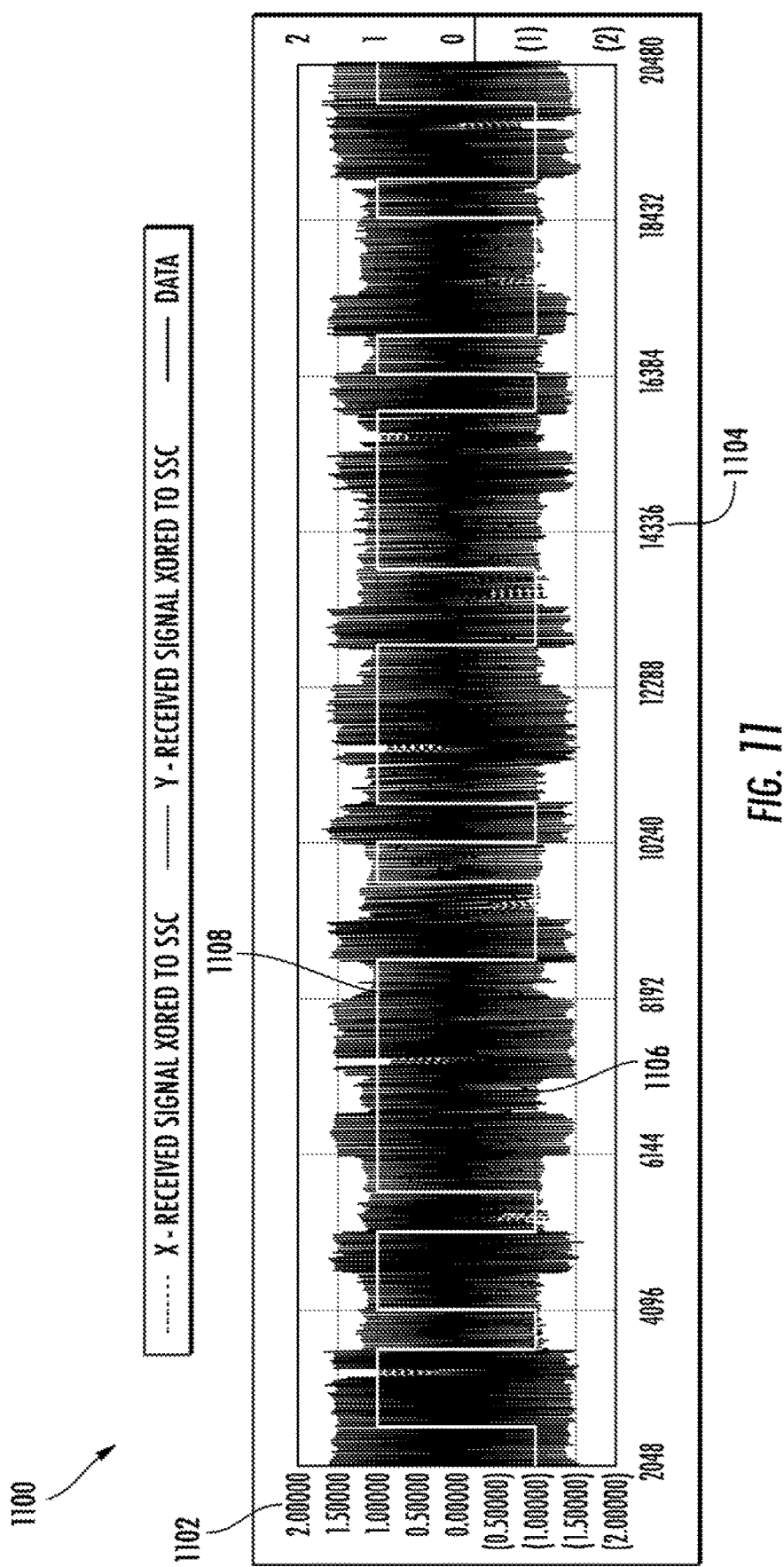
FIG. 11 illustrates a data signal being filtered from a received signal in accordance with aspects of the present disclosure.

FIG. 11 illustrates a data signal being filtered from a received signal in accordance with aspects of the present disclosure. As shown in the figure, graph 1100 includes a y-axis 1102 in units of detected mV, an x-axis 1103 in units of time, a received signal function 1106 and a retrieved data function 1108. FIG. 11 merely illustrates that once alignment is acquired, the data may be retrieved from the DSSS signal using the shuffled PN in a manner similar to that of conventional DSSS methods.

The non-limiting example system described above is only one implementation. While phase shift keying has been described, a system and method in accordance with the present disclosure is not exclusive to this waveform. Any Direct Sequence Spread Spectrum (DSSS) sequence acquisition could use a system and method in accordance with the present disclosure.

The non-limiting example implementation as discussed above with reference to FIGS. 5-11 checks sixteen different correlations at once with a simple iterative calculation that can be easily spatially multiplexed in a Field Programmable Gate Array (FPGA) to simultaneously check all possible alignments for large spread sequences. The method does not require first locking onto a carrier phase. However, upon completion the method provides the carrier phase and frequency offset of the desired transmission, allowing improved signal to noise ratios. This is to be contrasted with prior art methods that lock onto the carrier phase of the combine signal of all transmissions that are present, which does not provide as large a signal strength than when the carrier phase of just the desired transmission is used. The actual transmission carrier frequency can also be derived after the DSSS signal is acquired.

The foregoing description of various embodiments has been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed as new and desired to be protected by Letters Patent of the United States is:

1. A receiver for acquiring a DSSS signal from a transmitter, said receiver comprising:
   a pseudo-noise (PN) shuffler configured to circularly shift each of m subsections of a transmitter PN sequence and then to recombine the circularly-shifted subsections to create a shuffled PN, wherein m is an integer and wherein each subsection is representative of a separate alignment;
   a first multiplier operable to multiply the shuffled PN, using values 1 and −1 to depict the logic states 0 and 1, with the DSSS signal that has been received by the receiver to obtain an XORed signal;
   an absolute value component configured to receive the XORed signal and output an absolute value signal, wherein the absolute value component comprises a low pass filter configured to eliminate from the XORed signal any random positive or negative pulse having a pulse width that is shorter than a time required to receive one subsection of the XORed signal;
   a splitter operable to split the absolute value signal into a first signal and a second signal;
   a second multiplier operable to multiply the first signal by a sine function;
   a third multiplier operable to multiply the second signal by a cosine function; and
   a processor configured to sum outputs from the second and third multipliers to form an XY vector, and further configured to determine if one of the shuffled m alignments matches an alignment of the PN sequence of the transmitter based on a magnitude and angle of the XY vector.

2. The receiver of claim 1, wherein the PN shuffler is configured to circularly shift each of the m subsections by a spread code length L divided by the number of subsections m, wherein L is an integer.

3. The receiver of claim 1, wherein the PN shuffler is configured to circularly shift each $i^{th}$ subsection by (i−1)×(L/m), where L represents a spread code length and i is an index from 1 to m, wherein L is an integer.

* * * * *